United States Patent [19]

Cartland

[11]  4,329,206
[45]  May 11, 1982

[54] ALCOHOL DISTILLATION APPARATUS
[75] Inventor: William H. Cartland, Jupiter, Fla.
[73] Assignee: Solar Development Inc., Riviera Beach, Fla.
[21] Appl. No.: 138,016
[22] Filed: Apr. 7, 1980
[51] Int. Cl.³ ............................................. B01D 3/02
[52] U.S. Cl. .................................... 202/177; 202/182; 202/233; 203/19; 203/24; 203/26; 203/DIG. 13
[58] Field of Search ...................... 203/19, 24, 26, 100, 203/DIG. 13; 159/24 B; 202/163, 182, 177, 185 R, 185 C, 202, 205, 206, 197, 232–235, 159, 160, 176, 181

[56] References Cited
U.S. PATENT DOCUMENTS 2,615,833 10/1952 Dean et al. ................. 203/DIG. 14
2,637,684  5/1953 Buffum ................................ 202/177
2,975,107  3/1961 Friedman ............................ 202/234
3,351,537 11/1967 Peterson ............................ 202/234

Primary Examiner—Frank Sever
Attorney, Agent, or Firm—Jack N. McCarthy

[57] ABSTRACT

The distillation apparatus includes an upstanding closed boiler which receives a fluid mash, a mixture including alcohol and water, and has a plurality of heating means, including a pre-heat means, to boil the mash and produce a vapor at the top thereof; two heat exchangers are located at the bottom of the boiler; one is heated by fluid from a compressor and one is heated by exhaust gases from an internal combustion engine which drives the compressor. The fluid mash is removed from the boiler at a first point, passed through a solar panel and returned to the boiler at a higher level; the fluid mash is removed from the boiler at a second point, where new mash is added, and both used as the coolant for the engine; when the fluid has cooled the engine it is then passed over an enclosed coil which carries exhaust gases from the engine. It is then returned to the boiler at a higher level; exhaust gases from the engine are injected directly into the fluid mash adding heat thereto. The vapor from the boiler is passed through a condensing tower and collected at the top thereof where it is drawn off by a vacuum pump and passed through a series of condenser coils—one in air, one in a cooled water tank, and one in a jacket subjected to supercooling by fluid expanded from the compressor.

10 Claims, 1 Drawing Figure

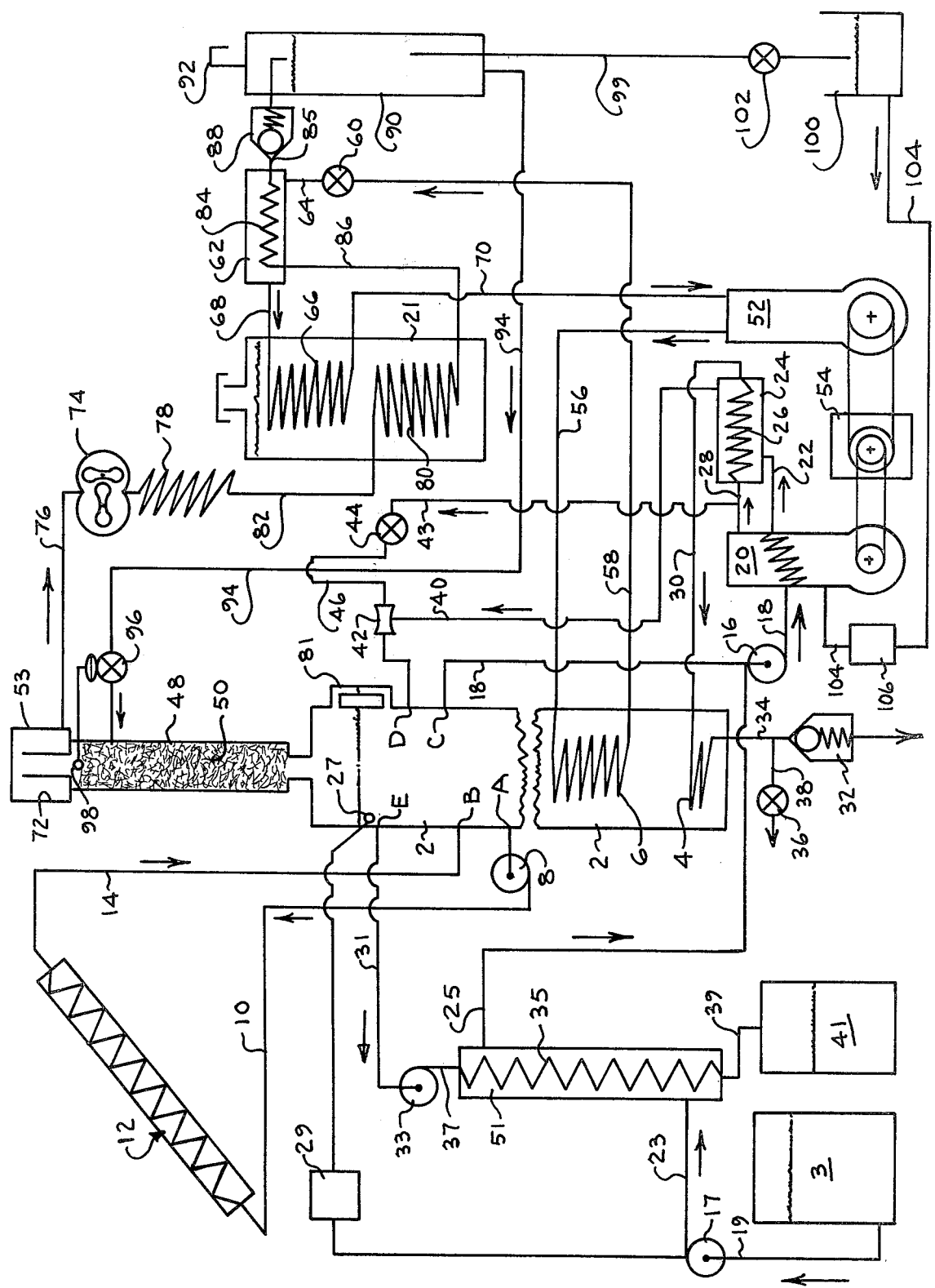

ALCOHOL DISTILLATION APPARATUS

BACKGROUND OF THE INVENTION

This invention relates to distillation apparatus and more particularly to the distillation of alcohol.

Many types of distillation apparatus have been used in the past to distill many fluids. Apparatus to obtain fresh water and alcohol are well known in the art; however, applicant's apparatus was not found. A sampling of the prior art is set forth below: U.S. Pat. No. 3,203,875; U.S. Pat. No. 3,214,352; U.S. Pat. No. 3,248,305; and U.S. Pat. No. 4,162,145.

SUMMARY OF THE INVENTION

An object of this invention is to produce a distillate using an apparatus for distilling which uses waste heat in a direct manner to obtain an efficient operation.

Another object of this invention is to use an engine having an exhaust discharge wherein the exhaust is injected directly into the boiler of a distillation apparatus.

A further object of this invention is to direct a fluid mash into the cooling system of an engine, whereby the fluid mash is heated, and then directed into a boiler. This fluid can be directed from a desired level in a boiler or directly from a supply tank.

Another object of this invention is to provide a preheat section using substantially hot water from the top of the operating boiler to heat the fluid mash supply.

A further object of the invention is to provide a venturi type ejector pump wherein the exhaust from an engine passes directly through the venturi providing the driving force and acts to draw the fluid mash being heated in the cooling system of the engine into the throat of the venturi and then into the boiler.

Another object of the invention is to provide a heat exchanger in the boiler through which exhaust gas from an engine can pass.

A further object of the invention is to provide a heat exchanger in the boiler through which a refrigerant from a compressor is passed to heat it by the heat of compression. The refrigerant is expanded and passed into a jacket to cool the distillate passing through a heat exchanger in the jacket. The refrigerant is then passed through a heat exchanger in a body of water to cool the water and heat the refrigerant before it is directed back to the compressor. The distillate from the boiler is directed through a heat exchanger in the same body of water to heat the water and cool the distillate.

Another object of the invention is to prevent extreme high temperatures in the vapors leaving the boiler. Cooled distillate is directed back into the vapors at a desired location and at a predetermined temperature to mix with and reduce the temperature of the vapors.

A further object of this invention is to provide a vacuum producing means to place a vacuum in the top of the boiler to aid the distillation process.

Another object of this invention is to provide a transmission means, driven by the engine providing waste heat, for driving the compressor and all pumps necessary to operate the apparatus.

BRIEF DESCRIPTION OF THE DRAWING

The FIGURE is a schematic of the distillation apparatus.

DESCRIPTION OF THE PREFERRED EMBODIMENT

An upstanding closed cylindrical boiler 2 receives an input of a fluid mash from a tank 3. The mash can be that resulting from the fermentation of starches, sugars, or other organic materials. A plurality of integrated means are provided to heat the fluid mash to boil off vapor from the top thereof. A heat exchanger coil 4 is located in the lower part of the boiler 2 and a second heat exchanger coil 6 is located above heat exchanger coil 4, both to be hereinafter described.

Conduit means 10 is connected at one end to a point A of the boiler 2 and at its other end to the inlet of a solar collector 12, a pump 8 is located in conduit means 10. The outlet of the solar collector 12 is connected to one end of a conduit means 14 which has its other end connected back into the boiler 2 at a higher point B. Control means are used to sense the temperature at the solar panel 12 and only turn the pump 8 on when heat can be added to the fluid mash in boiler 2.

Conduit means 18 is connected at one end to a point C of the boiler 2 and at its other end to the inlet of the internal cooling system of the engine 20; a pump 16 is located in conduit means 18. The outlet of the cooling system of the engine 20 is connected to the inlet of a jacket 24 by a conduit 22. The outlet of jacket 24 is connected by a conduit means 40 to the throat of the venturi section of an ejector pump 42, to be hereinafter discussed.

It is at this point that the fluid mash is injected into the apparatus. The tank 3, containing fluid mash, is connected to the inlet of a pump 17 by a conduit 19 and the outlet of the pump 17 is connected to the inlet of a heating jacket 51 by a conduit 23. The outlet of the jacket 51 is connected to conduit means 18 by conduit 25 to mix the supply in tank 3 with that already being distilled by boiler 2.

A temperature sensor 27 is positioned within the top of the boiler 2 to sense the temperature at a desired location. When this sensor 27 senses a predetermined temperature, the pump 17 is turned on by control 29, and when it senses a second predetermined temperature, the pump 17 is turned off. A sight glass 81 is provided on boiler 2 to check the level of fluid therein.

Hot liquid from the top of the fluid mash in boiler 2 is removed at a point E by a conduit 31 connected to the inlet of a scavenge pump 33. The outlet of the scavenge pump 33 is connected to the inlet of a heat exchanger coil 35 in jacket 51 by a conduit 37. A conduit 39 has one end connected to the outlet of heat exchanger 35 and the other end positioned to direct its flow into a holding tank 41. It is noted that the liquid being drawn off is for the greater part, water, and heats the fluid mash in jacket 51.

A heat exchanger coil 26 is located in jacket 24. The exhaust outlet from engine 20 is connected to one end of the heat exchanger coil 26 by a short conduit 28. The other end of the heat exchanger coil 26 is connected to one end of the heat exchanger coil 4 in boiler 2 by a conduit 30. The other end of the heat exchanger coil 4 is connected to a pressure relief valve 32 by conduit 34. A valve 36 is connected to conduit 34 by a short conduit 38. This valve 36 can be opened to reduce the back pressure from the exhaust system on the engine 20 when desired.

A conduit means 43 is connected at one end to short conduit 28 and extends through the venturi section of ejector pump 42 (to the boiler 2 at a higher point D). Flow in conduit means 43 through the venturi section of the ejector pump 42 provides the driving force and will place a suction on the associated end of conduit means 40 drawing fluid mash therein into the flow passing through the venturi section, carrying the heated fluid mash into the boiler 2. Conduit means 43 has a valve 44 therein which is normally open during operation, but can be closed if desired, such as for a leak check. The conduit means 43 also has a loop section 46 extending above the level of liquid in boiler 2 to prevent the solution therein from draining into the engine 20 through the exhaust.

A conventional compressor 52 is driven by engine 20 through a transmission means 54. A simple "Otto" cycle engine can be used. The compressor 52 compresses a refrigerant and it is directed from the outlet of the compressor 52 by a conduit 56 to the inlet of the second heat exchanger coil 6. Heat exchanger coil 6 is heated by the heat of compression of the refrigerant. The outlet of the heat exchanger coil 6 is connected by a conduit 58 to an expansion valve 60. Expansion valve 60 in turn has its outlet connected to the inlet of a jacket 62 by a short conduit 64. Jacket 62 has an outlet connected to the inlet of a heat exchanger coil 66 by a conduit 68. The outlet of the coil 66 is connected back to the inlet of the compressor 52 by a conduit 70. The heat exchanger coil 66 is located in the upper part of a vented tank 21 which contains water to act as a heat sink.

A tower 48 extends upwardly from boiler 2 and receives vapor from the boiler 2. This tower 48 is filled with copper wool 50 on which water will condense, allowing purer alcohol vapor to rise into a dome 53 on top of the tower 48 having an annular collecting manifold 72. The bottom of the annular collecting manifold 72 is connected to the inlet of a pump 74 by conduit 76. Pump 74 maintains a vacuum above the boiling mash in boiler 2 and draws the vapor from the annular collecting manifold 72.

The outlet of the pump 72 is connected to the inlet of a condensing coil 78, cooled by the atmosphere; the outlet of the condensing coil 78 is connected to the inlet of another condensing coil 80 by conduit 82. The condensing coil 80 is located in the lower part of tank 21, below heat exchanger coil 66, cooled by the water therein. The outlet of the condensing coil 80 is connected to the inlet of a third condensing coil 84 by conduit 86. The condensing coil 84 is located in jacket 62 and cooled by the expanded refrigerant which has passed through expansion valve 60. The outlet of condensing coil 84 is connected by conduit means 85 to the top of a first collection tank 90. A back pressure valve 88 is located in said conduit means 85. Tank 90 is vented to atmosphere by vent 92.

Tank 90 is connected to the top of tower 48 by a conduit means 94. A thermostatically controlled valve 96 is located in conduit means 94 with a sensor 98 located at the top of the tower 48 adjacent the inlet to the dome 53. At a predetermined high temperature, valve 96 is opened, permitting condensate to flow from tank 90 into the top of tower 48, preventing excessive temperatures therein.

Tank 90 also has a conduit means 99 extending from the bottom thereof which extends to a point above a storage tank 100. A valve 102 in conduit means 99 controls the flow of distillate therethrough.

Tank 100 is connected by a conduit means 104 through a control means 106 to engine 20 for providing a fuel thereto. Pumps 8, 16, 17, and 74 can be driven by transmission means 54.

I claim:

1. A distillation apparatus having boiler means for boiling a liquid substance, heat producing means for providing heat for a liquid substance in said boiler means, an engine, said heat producing means including means for transferring heat from said engine to a liquid substance in said boiler means, a compressor means, said compressor means having an outlet and an inlet, transmission means between said engine and said compressor means for driving said compressor by said engine, container means containing a liquid heat sink for substantially reducing external cooling requirements, a first heat exchanger coil for heating said liquid substance in said boiler means, said first heat exchanger coil having an inlet and outlet, first conduit means connecting said compressor means outlet to said inlet of said first heat exchanger, a second heat exchanger coil in said liquid heat sink, said second heat exchanger coil having an inlet and an outlet, second conduit means connecting said first heat exchanger outlet to the inlet of said second heat exchanger coil in said liquid heat sink for cooling it, third conduit means connecting the outlet of said second heat exchanger coil to the inlet of said compressor means, an expansion valve in said second conduit means for providing a cold gas to said second heat exchanger coil, a third heat exchanger coil in said liquid heat sink for heating it, means for passing a hot fluid through said third heat exchanger coil.

2. A combination as set forth in claim 1 including a fourth heat exchanger coil in said second conduit means between said expansion valve and the inlet to said second heat exchanger coil, a jacket around said fourth heat exchanger coil, said jacket having an inlet and outlet, fourth conduit means connecting the top of said boiler means to the inlet of said jacket to direct distillate therethrough, fifth conduit means connected to the outlet of said jacket for receiving distillate from said boiler means.

3. A combination as set forth in claim 1 wherein said third heat exchanger coil has an inlet and an outlet, fourth conduit means connecting the top of said boiler means to the inlet of said third heat exchanger coil to direct distillate therethrough, fifth conduit means connected to the outlet of said third heat exchanger coil for collecting the distillate from said boiler means.

4. A combination as set forth in claim 3 including a fourth heat exchanger coil in said second conduit means between said expansion valve and the inlet to said second heat exchanger coil, a jacket around said fourth heat exchanger coil, said jacket having an inlet and an outlet, said fifth conduit means being connected to the inlet of said jacket for directing distillate therethrough, sixth conduit means connected to the outlet of said jacket for collecting the distillate from said boiler means.

5. A combination as set forth in claim 3 including a collection tank, said fourth conduit means directing distillate from said boiler means to said collection tank.

6. A combination as set forth in claim 5 including a vapor collecting means at the top of said boiler means, sixth conduit means connected at one end to said collection tank and at its other end to said vapor collecting means, valve means in said sixth conduit, means for controlling said valve means for providing cooled distillate from said collection tank to said vapor collecting means to prevent excessive temperatures therein.

7. A combination as set forth in claim 6 wherein said vapor collecting means is formed as a tower for receiving a vapor from said boiler means, means are provided in said tower to permit water to condense out of the vapor allowing purer alcohol vapor to rise into the top of said vapor collecting means.

8. A combination as set forth in claim 7 wherein hot liquid from the top of liquid substance in said boiler means is removed including fifth conduit means connected to said boiler means just below the level of said liquid substance in said boiler means, a holding tank, said hot liquid being directed to said holding tank, said hot liquid being for the greater part water.

9. A distillation apparatus as set forth in claim 1 wherein said engine has an exhaust outlet, means for transferring heat from said engine to a liquid substance in said boiler means including a third conduit means connecting said exhaust outlet to the interior of said boiler means, said engine having a cooling passage means therein with an inlet and outlet, fourth conduit means connecting said boiler means to the inlet of said cooling passage means directing a liquid substance to said cooling passage means, fifth conduit means connecting said outlet of said cooling passage means back to said boiler means for directing a liquid substance back into said boiler means at a higher temperature, pump means for pumping a liquid substance from said boiler means through said engine cooling passage means back to said boiler means, said pump means including an ejector pump having a venturi section connected in said third conduit means, said fifth conduit means being connected to the side of the venturi section of said ejector pump for having a liquid substance drawn therefrom by engine exhaust passing through said venturi section and directing it to said boiler means with the engine exhaust.

10. A distillation apparatus as set forth in claim 9 including a heat exchanger, said heat exchanger having two flow paths, one flow path being located in said fifth conduit means between said venturi and the outlet to said cooling passage means, said other flow path being connected at one end to said engine exhaust outlet, the other end of said other flow path being connected to pressure relief means.

* * * * *